United States Patent [19]
Colton et al.
[11] Patent Number: 4,900,390
[45] Date of Patent: * Feb. 13, 1990

[54] QUASI-RANDOM DOT PATTERN ADHESIVE JOINING METHOD

[75] Inventors: Douglas E. Colton, Salinas; Fred A. Slautterback, Carmel Valley, both of Calif.

[73] Assignee: Slautterback Corporation, Monterey, Calif.

[ * ] Notice: The portion of the term of this patent subsequent to Jan. 26, 2005 has been disclaimed.

[21] Appl. No.: 291,409

[22] Filed: Dec. 21, 1988

Related U.S. Application Data

[63] Continuation of Ser. No. 36,802, Apr. 10, 1987, abandoned, which is a continuation-in-part of Ser. No. 863,088, May 14, 1986, Pat. No. 4,721,252.

[51] Int. Cl.[4] ..... B32B 7/14
[52] U.S. Cl. ..... 156/291; 156/295; 118/313; 239/8; 264/13; 427/256; 427/422; 427/424
[58] Field of Search ..... 156/291, 295, 324, 74; 239/8; 427/421, 422, 424, 208.2, 256; 118/DIG. 16, 410, 411, 313, 315; 264/13; 425/7, 8

[56] References Cited

U.S. PATENT DOCUMENTS

| | | | |
|---|---|---|---|
| 2,551,538 | 5/1951 | Hensel | 239/424 |
| 3,348,520 | 10/1967 | Lockwood | 118/2 |
| 3,406,905 | 10/1968 | Reilly et al. | 239/84 |
| 4,031,854 | 6/1977 | Sprague, Jr. | 118/641 |
| 4,065,057 | 12/1977 | Durmann | 239/79 |
| 4,549,915 | 10/1985 | Ritschel et al. | 156/291 X |
| 4,592,507 | 6/1986 | Benedict | 239/172 |
| 4,636,425 | 1/1987 | Johnson et al. | 156/78 X |
| 4,721,252 | 1/1988 | Colton | 118/315 X |

*Primary Examiner*—Michael W. Ball
*Assistant Examiner*—Jeff H. Aftergut
*Attorney, Agent, or Firm*—Thomas Schneck

[57] ABSTRACT

A method of joining surfaces involving dispensing of hot-melt adhesive onto one of the surfaces in a pattern of quasi-random dots splattered onto the surface. The dots are made by breaking a fluid stream of hot-melt adhesive into irregular globules near the tip of a nozzle. The globules are sufficiently massive to remain molten yet will travel in a directed trajectory. Coverage in a stripe pattern has a quasi-random coverage feature where there is a more than likely probability of encountering a dot along any line parallel to the stripe direction within a distance less than the width of the stripe.

16 Claims, 4 Drawing Sheets

QUASI-RANDOM DOT PATTERN ADHESIVE JOINING METHOD

CROSS REFERENCE TO RELATED APPLICATIONS

This is a continuation of co-pending application Ser. No. 036,802 filed on Apr. 10, 1987, now abandoned, which is a continuation-in-part of prior co-pending application Ser. No. 863,088, filed May 14, 1986, now U.S. Pat. No. 4,721,252.

DESCRIPTION

1. Technical Field

The present invention relates to a method for the dispensing of viscous thermoplastic adhesive materials and in particular to a method of joining two surfaces with hot-melt adhesive material and the like.

2. Background Art

Hot-melt adhesives are used in the automated packaging industry for sealing cases and cartons. Usually, melted adhesive is extruded under high pressure through a nozzle, the adhesive being applied to upper and lower major and minor flaps of cartons in long continuous strips. The use of high pressure to force hot-melt adhesives through nozzle orifices presents an occupational risk, since a rupture in the equipment could spray hot material in any direction. Further, the expense of pressure resistant hoses, fittings and couplings could be eliminated if nozzle performance, using low pressure apparatus, could equal that produced with high pressure equipment. Much attention has been devoted to improving dispensing nozzles so as to provide adequate adhesive flow at lower pressures, as well as eliminating tailing, stringing, drooling, dripping and clogging between applications.

It has been realized that continuous strips of hot-melt adhesive represent a considerable use of material. One solution is to produce a series of regular short linear dots or dashes instead of a continuous strip. In U.S. Pat. No. 3,348,520, Lockwood discloses an apparatus which produces linear dots or dashes of hot-melt by opening and closing valves in the nozzles at a high cycling rate. Valves in the dispensing head are responsive to the alternating high pressure stroke and suction stroke of a pump. The valve in each nozzle also ensures clean sharp closure of the nozzles, thereby preventing any tendency towards dripping Typically, cartons in an automated assembly line travel past the hot-melt adhesive dispenser at a rate of about 400 to 600 feet per minute. The rapid and repeated opening and closing of the valves, which is required to produce short adhesive dots or dashes, is hard on the seats and valves.

In U.S. Pat. No. 4,031,854, Sprague, Jr. teaches a method in which adhesive is extruded as a band of overlapping loops. A jet providing a gas stream has a rotational component causing swirling of the extruded adhesive filament. The gas stream should be heated to about 100° F., the nozzle should be within three inches from the application surface, and the supply rate of fluid adhesive should be such that the filaments are at least two mils in diameter Otherwise, the adhesive may harden, either before it reaches the application surface, causing stringing, or before the surfaces to be adhered are pressed together.

In U.S. Pat. No. 4,065,057, Durmann teaches an apparatus for spraying powdered heat responsive material, such as resin. The material is then melted by heated compressed air downstream of and away from the nozzle. This approach prevents problems, such as powder clumping, associated with apparatus which heat the material prior to being discharged from the nozzle.

Nozzle assemblies which spray melt materials have had limited success. Prior art units need to be about six inches from the application surface for proper spray formation, especially when the generally viscous hot-melt adhesives are used. However, at this distance the melt materials may cool and harden in ambient air before reaching the application surface. At low pressures, inadequate flow and improper spray formation, including misting, may occur. Misting, i.e., the production of extremely fine droplets of melt material, is undesirable for some applications, such as the sealing of cartons.

It is an object of the present invention to produce a dispensing method for hot-melt material which operates at low pressures and which results in a considerable saving of the amount of hot-melt material used.

It is another object of the present invention to produce a dispensing method, especially for joining two surfaces, which can dispense preheated hot-melt adhesive onto a surface without stringing, misting or premature hardening of the material.

DISCLOSURE OF THE INVENTION

The above objects have been met with a hot-melt adhesive dispensing method which sputters hot-melt adhesive, sometimes referred to simply as "hot-melt", onto surfaces at very close range. The method involves deposition of a quasi-random pattern of hot-melt in a stripe or strip, with molten globules forming a dot splatter pattern, with preferably a dot distribution such that the probability of encountering a dot along any line parallel to the stripe within a distance less than the width of the stripe is greater than 50%. More generally, anywhere from 15% to 75% of the distance along any line in a hot-melt areawise pattern should be covered by molten adhesive globules, with each line measured having a different hot-melt distribution from every other line.

The method is used in adhesively joining two surfaces by directing a stream of hot-melt adhesive toward a first surface. The stream is broken into irregular globules by a gas stream interacting with a nozzle in an irregular way, either within the nozzle or outside of the nozzle. Most of the globules have a dimension in the range of 1/32 of an inch to ⅛ of an inch of thermoplastic adhesive, preferably ethylvinylacetate or polyethylene.

The irregular pattern provided by the present invention provides sufficient area wide coverage for joining two surfaces, yet achieves a substantial saving over either 100% areawise coverage or even a dot and dash stitch pattern of stripes of equal volume. The same volume of material used in a quasi-random dot pattern will provide greater areawise coverage than prior methods, for example, a dot and dash stripe pattern. In one embodiment, a stream of air and hot-melt is provided at the tip of a nozzle. Air under slight pressure, axially parallel to a hot-melt stream, expands as it escapes from the nozzle, breaking the hot-melt stream into irregular globules as the hot-melt stream flies from the nozzle. Because the desired size of hot-melt globules is maintained within a range, the globule pattern is not completely random, but quasi-random.

BEST MODE FOR CARRYING OUT THE INVENTION

The present invention involving the sputter deposition of hot-melt adhesive material requires that a fluid stream of hot-melt adhesive be directed toward a first surface and be broken up into irregular globules The hot-melt itself is a thermoplastic, packaging grade adhesive usually having a composition which is approximately ⅓ plastic resin, ⅓ wax and ⅓ tackifying resin. The latter ingredient is usually ethylvinylacetate or polyethylene. This resin is to be distinguished from pressure sensitive adhesives. The preferred adhesives form dots which will flow radially and maintain globule size sufficient to retain heat even after deposition. A nozzle is usually used to direct the fluid stream toward a first surface. The nozzle contains separate streams of a gas under slight pressure and the hot-melt adhesive. The function of the gas is to break up the fluid stream without causing it to be introduced into the adhesive If the gas is introduced into the adhesive, undesirable foaming may result, causing a loss in the desired adhesive properties. The gas must be used against the fluid stream in a manner which causes the formation of irregular sized globules which have sufficient mass to remain molten after contact with a first surface, yet are not so massive as to be deflected by gravity from travel to a target or from providing a significant amount of areawise coverage at the target surface. It is intended that the fluid stream directed toward a target surface provide area wide coverage in a quasi-random splatter pattern. For example, in a stripe pattern, if a line is drawn anywhere within the stripe, parallel to the stripe direction, one should encounter a globule within a distance less than the width of the stripe. The probability for this event should be greater than 50%, but typically not as high as 100%.

Described below is a nozzle wherein an air stream breaks up a fluid stream as the fluid stream emerges from the nozzle. However, other nozzles have been developed wherein the fluid stream is broken up by a gas prior to emergence from the nozzle.

The nozzle manifold assembly shown for exemplary purposes has nozzles located on a dispensing bar with both material and heat conducting paths to a heated low pressure hot-melt dispenser head. The nozzle assembly is designed to ensure that sufficient flow and proper dispensing of the adhesive is maintained under low pressure hot-melt delivery conditions of below 150 pounds per square inch.

Figure 1:
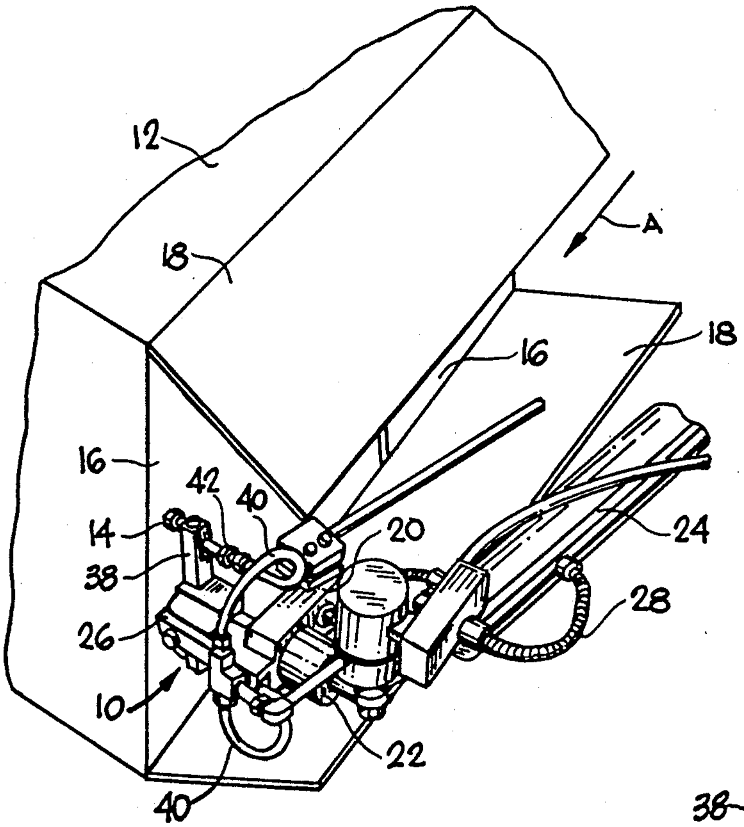
FIG. 1 is a perspective view showing exemplary apparatus employed in carrying out the method of the present invention in a carton sealing configuration illustrating the application of hot-melt adhesive to carton flaps using two nozzle manifolds.
Figure 2:
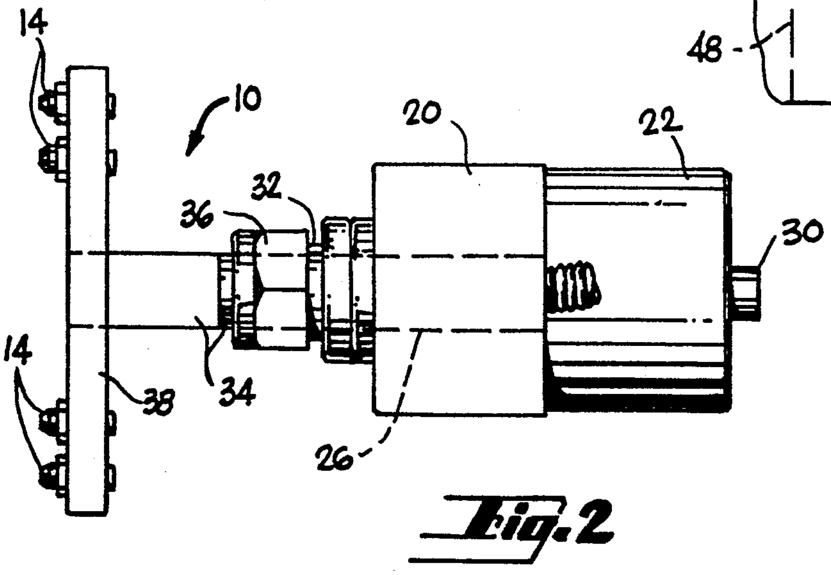
FIG. 2 is a plan view of the nozzle manifold of FIG. 1.

With reference to FIGS. 1 and 2, a nozzle manifold 10 is shown in use in an automated carton sealing assembly line. A carton 12 is positioned laterally and moves along rollers, not shown, in the direction of Arrow A. Hot-melt adhesive is sprayed from nozzles 14 onto the outside surfaces of minor flaps 16 of the carton. Major flaps 18 are thereafter brought into contact with the minor flaps 16 to effect sealing.

The nozzle manifold 10 is attached to a fixed position heated hot-melt dispenser head 20 through which hot-melt adhesive passes by means of a solenoid valve 22 from heated hose 24 connected to a melting tank, not shown. A heat transfer block 26, shown in phantom in FIG. 2, conducts heat from the heated dispenser head 20 to the nozzle manifold 10. The heat transfer block 26 should be sufficiently massive and thermally conductive to be a heat reservoir which will maintain the temperature of the nozzles 14 with a temperature drop relative o the head of 40°–50° F., without a separate heat source for the blocks. Moreover, the limited drop can be maintained for short times in the event the head momentarily loses its heat source. Dispensing head 20 may be heated electrically with power supplied through power line 28.

Hot-melt material enters the solenoid valve 22 at an inlet 30. After passing through the solenoid valve 22 and the heated dispenser head 20, the adhesive exits through outlet 32. Dispenser heads are well known and are commercially available. An inlet section 34 of the nozzle manifold 10, having a center bore, not shown, is joined to the outlet 32 of the dispenser head 20 by means of a swivel nut 36 in a direct hot-melt material dispensing line with the inlet 30. The swivel nut 36 allows tolerances for a leak-free attachment of the inlet section 34 of the manifold to both the dispenser head 20 and to the heat transfer block 26.

The inlet section 34 of the nozzle manifold is connected to a rectangularly shaped dispensing bar 38. The dispensing bar includes a longitudinal bore, not shown, which supplies hot-melt adhesive from the inlet section 34 to the nozzle 14. FIG. 1 shows separate hoses 40 and couplings 42 for supplying a stream of gas to each nozzle 14. However, the stream of gas is more preferably channeled through the longitudinal bore of the dispensing bar 38, parallel the flow of hot-melt adhesive. In this manner, the stream of gas will be heated prior to contact with the hot-melt at the nozzle outlets.

The dispensing bar 38 of a side-application nozzle manifold 10 has a vertical orientation. Thus, hot-melt material projected from a nozzle 14 is projected horizontally and, consequently, will be affected by gravitational force. The distance between nozzles 14 and a carton 12 must be minimized while still providing the area wide application needed to ensure proper sealing of the carton. An additional consideration in side application nozzle manifolds is a product of having an upright dispenser bar 38. The upright dispenser bar results in a column of hot-melt material which is urged downwardly for escape from the lowermost nozzle 14. The present invention addresses the problems inherent in horizontal application of hot-melt adhesive, but is not limited to such applications.

Figure 3:
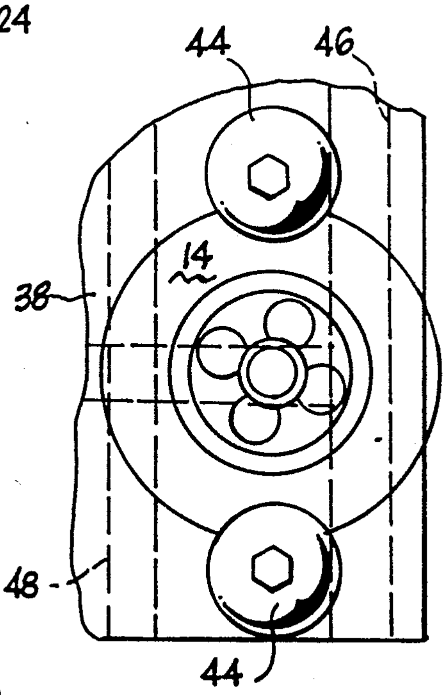
FIG. 3 is an end view of a nozzle system in accord with the present invention.

FIG. 3 is a front end view of a nozzle 14 secured to a dispenser bar 38 by hex-head screws 44. The dispenser bar has a first longitudinal bore 46 shown in phantom, which supplies hot-melt adhesive to the nozzle. A second longitudinal bore 48, also shown in phantom, connects a gas supply tank to the nozzle 14.

Figure 4:
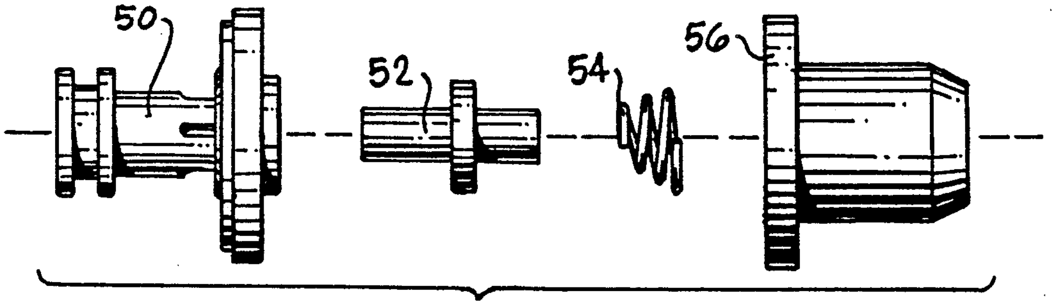
FIG. 4 is an exploded view of the nozzle system of FIG. 3.

Referring now to FIG. 4, a nozzle includes a nozzle body member 50, a valve member 52, a helical valve spring 54 and a compression cap 56. As will be shown more clearly below, the valve member 52 is slidably fit within a passageway of the nozzle body member 50. The conically helical spring 54 is fitted about an end of the valve member and contacts the compression cap 56 to yieldingly urge the valve member against the nozzle member.

Figure 7:
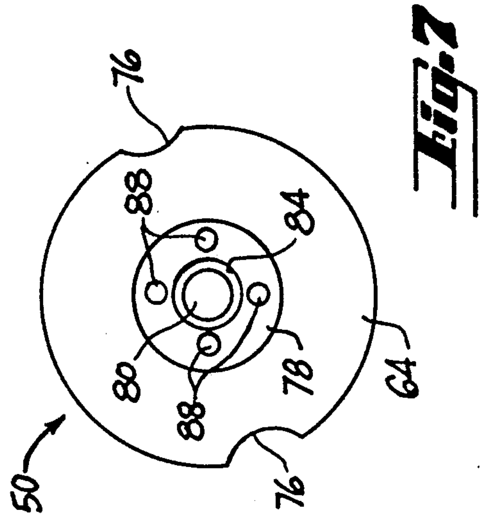
FIG. 7 is a front view of the shuttle member of FIG. 5.
Figure 5:
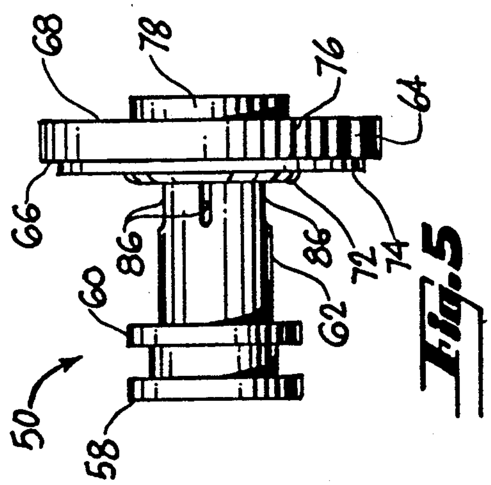
FIG. 5 is a side view of the shuttle member of FIG. 4.
Figure 6:
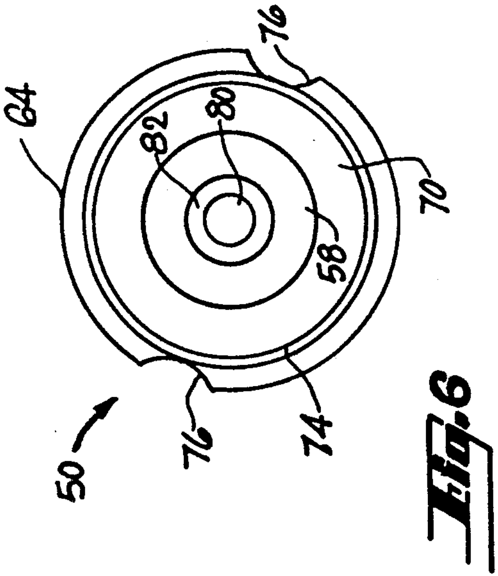
FIG. 6 is a rear view of the shuttle member of FIG. 5.

The nozzle body member 50 may be seen in more detail in FIGS. 5–7. The nozzle body member is a brass material having first and second flanges 58 and 60 spaced apart for retention of a sealing O-ring, not shown. A cylindrical midsegment 62 of the nozzle body member mushrooms to form an annular engagement segment 64 for contact with a dispensing bar at a rear surface 66 and contact with a compression cap at a forward surface 68. The rear surface 66 has an O-ring seat 70 defined by a stepped region 72 and an O-ring retention rim 74. As noted above, a nozzle 14 is secured to a dispenser bar by means of hex head screws. For this reason the engagement segment 64 includes opposed notches 76 which provide clearance for the threads of a screw. A cylindrical valve seat 78 projects from the forward surface 68 of the engagement segment 64.

A gas passageway 80 along the longitudinal axis of the nozzle member 50 provides a portion of a gas flow path through a nozzle. The gas passageway 80 of the nozzle member illustrated in FIGS. 5–7 has a varying diameter. An inlet section 82 of the gas passageway has a truncated conical shape to permit acceleration of a given stream of gas which enters the nozzle member. While the dimensions of the inlet section are not critical to the proper operation of the nozzle, the acceleration aids in minimizing the required gas pressure that must be supplied to a nozzle to achieve a desired result. At the downstream end of the gas passageway there is a minor widening, as seen at 84 of FIG. 7. This widening facilitates mating of a valve member with a nozzle member.

The cylindrical midsegment 62 of a nozzle member 50 includes openings 86 which lead to a square array of material passageways 88 that partially define a hot-melt material flow path through a nozzle. While a square array is preferred, other geometrically regular arrays of material passageways are possible, such as at the corners of a regular triangle or a regular pentagon. The number of material passageways is not critical since, if desired, the nozzle will function with use of a single nozzle. Each material passageway 88 is equidistant from the gas passageway 80.

Figure 11:
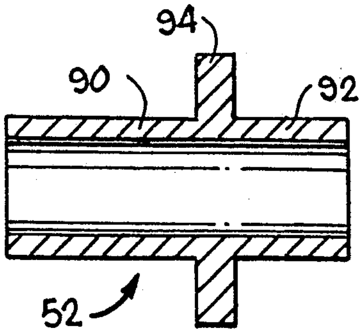
FIG. 11 is a side sectional view of the valve member of FIG. 4.
Figure 10:
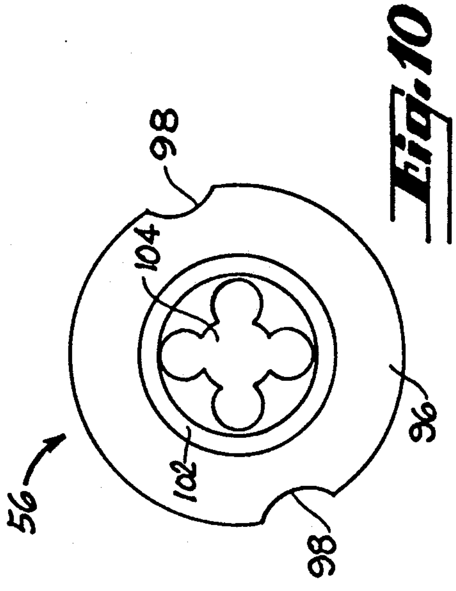
FIG. 10 is a front view of the compression cap of FIG. 8.
Figure 8:
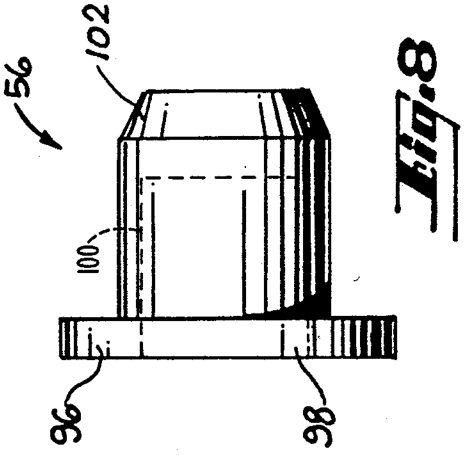
FIG. 8 is a side view of the compression cap of FIG. 4.
Figure 9:
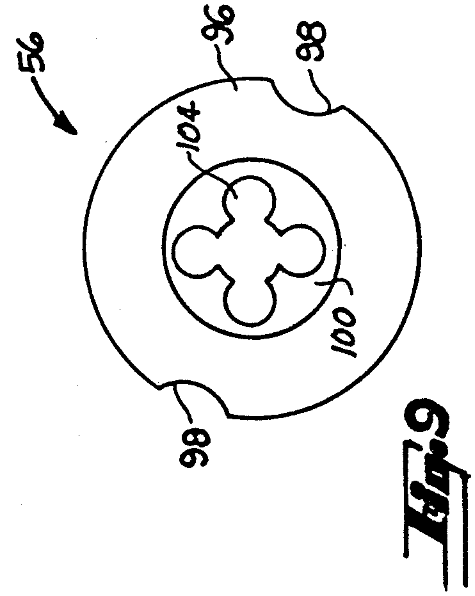
FIG. 9 is a rear view of the compression cap of FIG. 8.

Referring briefly to FIG. 11, the valve member 52 includes a first tubular segment 90 which is slidably fit within a gas passageway 80 of the nozzle body member of FIG. 5. The valve member further includes a second tubular segment 92 that is spaced apart, at least externally, from the first tubular segment 90 by a shoulder 94. The shoulder 94 has a radial dimension sufficiently great to cover the material passageways 88 of a nozzle member. The tubular body of the valve member 52, however, permits gas flow through the nozzle to pass unobstructed. FIG. 11 shows a single configuration of a valve member. It is to be understood that the present invention is not limited to this configuration FIGS. 8–10 illustrate a compression cap 56 in detail. The compression cap has an annular engagement surface 96 which contacts a forward surface 68 of the nozzle member 50 when a nozzle 14 is fully assembled. Like the nozzle member, the compression cap includes notches 98 to provide clearance for the threads of a screw. The compression cap 56 has a recess 100 at the rearward end for receipt of a helical spring 54, the valve member 52 and the valve seat 78 of a nozzle member 50. Tapering 102 at the forward end of the compression cap reduces the risk of adhesive-material drool.

A cloverleaf orifice 104 in the compression cap 56 provides an opening for escape of both a stream of gas and a stream of hot-melt material from a nozzle. The area of the orifice is less than the cross section of the passageway in the cap. The cloverleaf orifice 104 comprises a square array of four openings joined at a center. Alignment of the notches 98 of the compression cap with the notches 76 of a nozzle member 50 will align the square array of openings with the material passageways 88. The configuration of the orifice 104 is not critical but the orifice should be closely aligned with the configuration of the material passageways 88.

Figure 12:
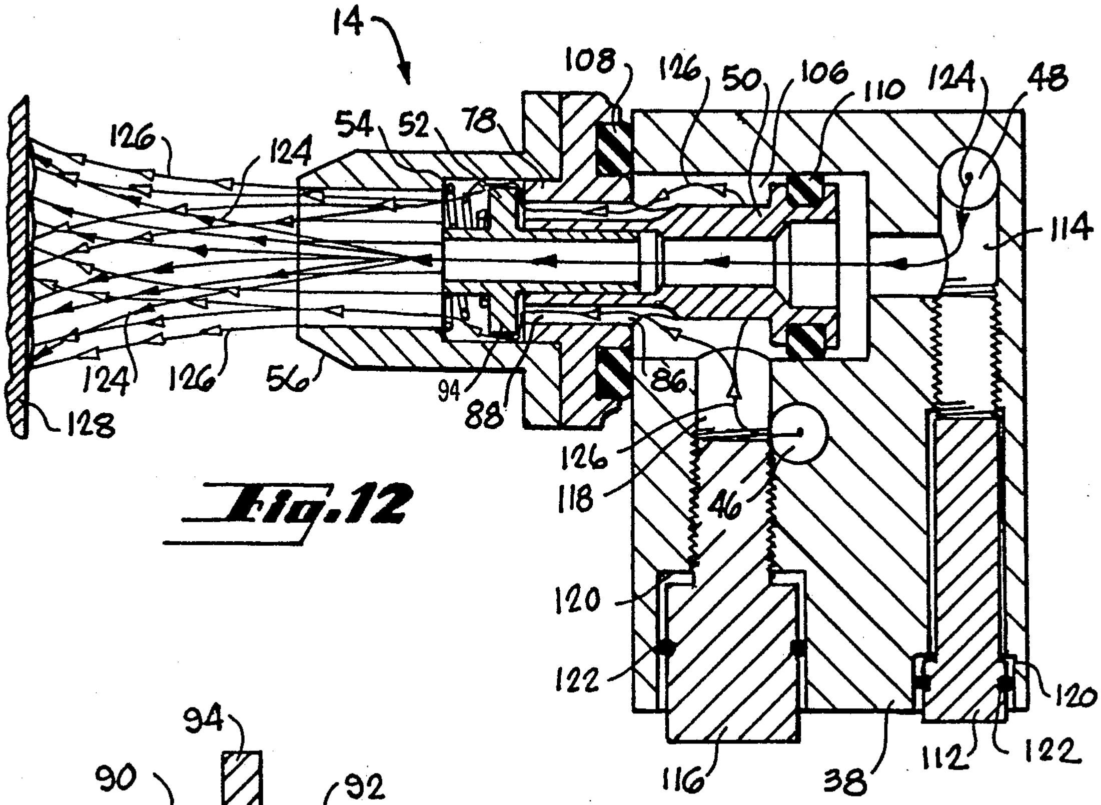
FIG. 12 is an operational view of the nozzle system of FIG. 1.

FIG. 12 illustrates a nozzle 14 coupled to a nozzle recess 106 in a dispenser bar 38. A forward O-ring 108 and a rearward O-ring 110 are provided to prevent pressure leakage.

A gas restriction bolt 112 regulates the gas flow from the longitudinal bore 48 of the dispenser bar 38. The gas restriction bolt 112 is threaded into a gas restriction bore 114 which permits gas flow from the longitudinal bore 48 to the nozzle 14. Rotation of the bolt 112 regulates gas flow to the nozzle by interfering with the fluid communication of the longitudinal bore 48 with the nozzle. In like manner, a material restriction bolt 116 regulates hot-melt material flow from the longitudinal bore 46 through a threaded material restriction bore 118 and to the nozzle 14. A method of regulating hot-melt material pressure and gas pressure at individual nozzles is especially important in applications having a columnar arrangement of nozzles, since without such a method pressure would decrease after each succeeding nozzle. Moreover, in the case of material flow, pressure is increased at the lowermost nozzle of a column of nozzles because of the mass of the column of material. Each restriction bore 114 and 118 has a shoulder 120 and each restriction bolt 112 and 116 has an O-ring 122, thereby preventing pressure leakage.

In operation, the flow path 124 of the gas is an inner flow path. That is, the gas flow path is surrounded by the outer hot-melt material flow path 126. The two flow paths 124 and 126 are prevented from communicating by the rearward O-ring 110. The gas flow path 124 extends from the longitudinal bore 48 of the dispensing bar 38, through the gas passageway of the nozzle member 50, and through the valve member 52, whereupon the stream of gas will begin to expand.

The axially outward hot-melt material flow path 126 extends from the longitudinal bore 46 and material enters the nozzle member 50 at side openings 86 for passage through the material passageways 88. At the termination of the material passageways 88 a stream of hot-melt material will encounter the shoulder 94 of the valve member 52. The valve member is biased by helical valve spring 54 to block flow from the nozzle member. The valve spring, however, yieldingly urges the valve member, so that the valve member is capable of axial movement when a threshold hot-melt material pressure is reached. Nozzles 14 operate at low pressure, with hot-melt being at a pressure of less than 150 pounds per square inch and the gas stream being at a pressure less than ten pounds per square inch. In an automated assembly line application the hot-melt material is repeatedly pressurized and then depressurized. When pressurized the hot-melt material exceeds the threshold pressure which is required to move the shoulder 94 from the valve seat 78 of the nozzle member 50. Hot-melt material may then flow around the shoulder 94. Upon depressurization of the hot-melt material, the shoulder will once again seat against the nozzle member. Thus, the tendency of the lowermost nozzle in a column of nozzles to drool is overcome.

A stream of hot-melt material that progresses downstream of the shoulder 94 of the valve member 52 will enter the cloverleaf orifice of the compression cap 56. The openings along the cloverleaf orifice act as lips upon which a mass of hot-melt material will begin to accumulate. The compression cap creates a resonant condition whereupon impingement of the stream of gas onto the hot-melt material produces an oscillatory effect which sprays the hot-melt onto a worksurface 128 in an irregular but regulated pattern. This quasi-cavitational resonance is within the audible range. Because there is an axially inward gas flow path to disperse an axially outward stream of material, sufficient area wide coverage is possible at a distance as close as two inches. Such short distances are favorable because heat in the melt is preserved against air cooling.

The hot-melt material is applied to a work-surface 128 in a stripe pattern. The width of the stripe and the maximum size of a globule that strikes the work-surface may be regulated by adjusting the gas flow pressure and/or the material flow pressure either at the sources or by rotation of regulating bolts 112 and 116. The gas should impinge the material flow in a manner which causes the formation of irregular sized globules which have sufficient mass to remain molten after contact with a first surface, yet are not so massive as to be significantly deflected by gravity from travel to a target or from providing a sufficient amount of areawise coverage upon the worksurface. It is intended that the fluid stream directed toward a target surface provide an areawise coverage in a quasi-random splatter pattern with globules or droplets of hot-melt adhesive material ranging in size from about one millimeter, or finer, to a fraction of an inch, say two cm, as measured in any single direction on a surface.

Figure 13:
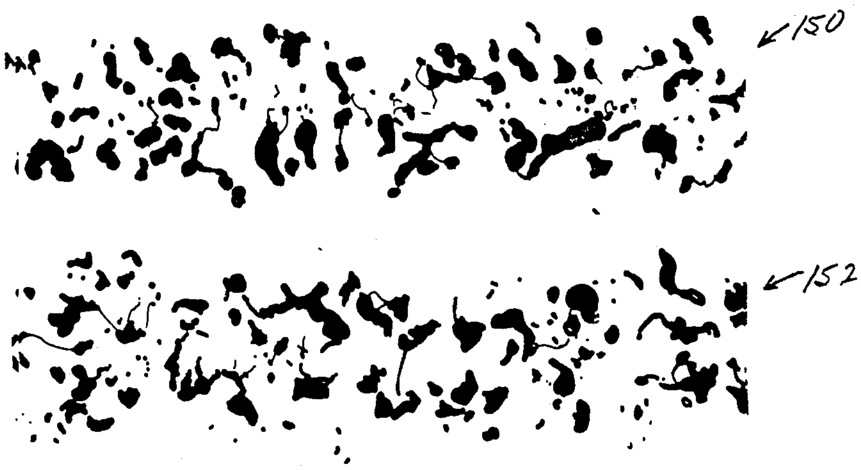
FIG. 13 is a top view of parallel hot-melt stripes exhibiting a quasi-random dot splatter pattern.

With reference to FIG. 13, a pair of stripes 150, 152 is shown, each having a quasi-random dot splatter pattern. The pattern is formed by molten globules of hot-melt adhesive which have been dispensed onto a surface by a pair of nozzles previously described. The globules retain heat until a surface is brought down into pressure contact with them whereupon there is a radial flow from the center of each globule, flattening each globule and wetting both surfaces for adhesive bonding. Most globules are individually spaced, with little overlap between globules, yet providing good quasi-random coverage. As previously explained, quasi-random coverage means that there is a more than likely probability of encountering a dot on any line drawn in the stripe direction within a distance less than the width of the stripe. While this is not a necessary condition for a splatter pattern in accord with the present invention, it provides a desired deposition at a significant savings of hot-melt adhesive compared to the regular and uniform patterns of the prior art.

While the apparatus for employing the method of the present invention has been described with reference to an applicator which provides horizontal sputtering onto a worksurface, it is understood that the valved nozzle may be employed for application onto a horizontal worksurface. Additionally, the method, as well as the apparatus, may be used for applications other than the sealing of cartons or used with materials other than hot-melt adhesive.

We claim:

1. A method of adhesively joining two surfaces comprising, directing a fluid stream of hot-melt adhesive toward a first surface, breaking the fluid stream into irregular molted globules sufficiently massive as to remain molten even after contact with the first surface, said breaking of the fluid stream occurring prior to contact with said first surface in a non-misting manner, covering a portion of the first surface with a stripe of said molten globules in the form of a quasi-random dot splatter pattern, said splatter pattern having voids between said globules, and bringing a second surface into pressure contact with the stripe while said globules are still molten.

2. The method of claim 1 wherein said splatter pattern has a dot distribution such that the probability of encountering a dot along any line parallel to and anywhere within the stripe within a distance less than the width of the stripe is greater than 50%.

3. The method of claim 1 wherein said globules are formed by interrupting and breaking said fluid stream with an air stream.

4. A method of joining two surfaces comprising, dispensing in a non-misting airborne manner an areawise splatter pattern of molten hot-melt adhesive globules onto a first surface, the molten globules distributed in a splatter pattern such that on a straight line through the pattern there will be a quasi-random distribution of hot-molten globules and voids, with globules occupying between 15% and 75% of the distance along the line and the voids occupying the remainder, with the distribution on any other straight line through the pattern being different from said straight line, said globules having sufficient mass to remain molten after contact with the first surface, and bringing a second surface into contact with said molten hot-melt.

5. The method of claim 4 wherein said dispensing of molten hot-melt is achieved by breaking a stream of hot-melt adhesive with a gas stream.

6. The method of claim 4 wherein said areawise splatter pattern comprises at least one stripe.

7. The method of claim 6 wherein the distribution of globules in said splatter pattern is such that the probability of encountering a hot-melt globule along a straight line parallel to and anywhere within said stripe in a distance less than the width of the stripe is more likely than not.

8. The method of claim 5 wherein said stream of hot-melt adhesive is broken by expanding a gas stream axially parallel to and within a stream a hot-melt.

9. The method of claim 8 wherein said gas expansion is created by releasing pressure on a gas stream within a passageway.

10. The method of claim 4 wherein most of said molten globules on said first surface have a size distribution in the range one millimeter to two centimeters measured in any single direction.

11. A method of joining two surfaces comprising, forming a flowable stream of hot-melt adhesive within a dispenser having a nozzle, aiming said nozzle at a surface, breaking up said flowable stream, in a non-misting manner, with a stream of gas into irregularly shaped molten globules at said nozzle, the irregular shape of said globules defining a dot splatter pattern on the surface consisting of a distribution of globules, the size of said globules being maintained within the range of one millimeter to two centimeters as measured on an any single direction, with voids between globules.

12. The method of claim 11 wherein an areawise splatter pattern comprises at least one stripe.

13. The method of claim 12 wherein the distribution of globules in said splatter pattern is such that the probability of encountering a hot-melt globule along a straight line parallel to and anywhere within said stripe in a distance less than the width of the stripe is more likely than not.

14. The method of claim 11 wherein said stream of hot-melt adhesive is broken by expanding said gas stream axially parallel to and within said stream of hot-melt.

15. The method of claim 14 wherein said gas expansion is created by releasing pressure on a gas stream within a passageway.

16. A method of adhesively joining two surface comprising, dispensing in an airborne non-misted manner a splatter pattern of molten hot-melt adhesive molten globules on a first surface in a stripe having a length and a width, the pattern having a irregular distribution of said molten globules of various non-uniform sizes such that the probability of encountering a globule along a straight line parallel to and anywhere within said stripe in a distance less than the width of the stripe is more likely than not, and bringing a second surface into pressure contact with the stripe while said globules are still molten.

* * * * *

UNITED STATES PATENT AND TRADEMARK OFFICE
CERTIFICATE OF CORRECTION

PATENT NO. : 4,900,390

DATED : February 13, 1990

INVENTOR(S) : Douglas E. Colton et al.

It is certified that error appears in the above-identified patent and that said Letters Patent is hereby corrected as shown below:

Column 2, line 53, "area wide" should read - - areawide - -.

Column 3, line 38, "globules" should read - - globules. - -.

Column 3, line 51, "adhesive" should read - - adhesive. - -.

Column 3, lines 61-62, "area wide" should read - - area-wide - -.

Column 4, line 32, "o the head" should read - - to the head - -.

Column 4, line 66, "area wide" should read - - areawide - -.

Column 7, line 35, "area wide" should read - - areawide - -.

Column 7, line 42, "work-surface" should read - - worksurface - -.

Claim 1, column 8, line 24, "molted globules" should read - - molten globules - -.

Claim 4, column 8, line 50, "hot-molten globules" should read - - hot-melt globules - -.

UNITED STATES PATENT AND TRADEMARK OFFICE

CERTIFICATE OF CORRECTION

PATENT NO. : 4,900,390

DATED : February 13, 1990

INVENTOR(S) : Douglas E. Colton et al.

It is certified that error appears in the above-identified patent and that said Letters Patent is hereby corrected as shown below:

Claim 5, column 8, line 61, "molten hot-melt" should read -- molten hot melt --.

Claim 16, column 10, line 14, "two surface" should read -- two surfaces --.

Claim 16, column 10, line 19, "a irregular" should read -- an irregular -- .

Signed and Sealed this

Nineteenth Day of March, 1991

*Attest:*

HARRY F. MANBECK, JR.

*Attesting Officer*

*Commissioner of Patents and Trademarks*